Oct. 29, 1963  F. H. NUMRICH  3,109,046
WINDOW AND PASSIVE INTERFERENCE GENERATOR
Filed Dec. 18, 1961  2 Sheets-Sheet 1

INVENTOR.
FRED H. NUMRICH
BY
Laurence S. Epstein
ATTORNEY 3,109,046
WINDOW AND PASSIVE INTERFERENCE
GENERATOR
Fred H. Numrich, Wayne, N.J., assignor, by mesne assignments, to the United States of America as represented by the Secretary of the Navy
Filed Dec. 18, 1961, Ser. No. 160,377
8 Claims. (Cl. 35—10.4)

This invention relates to an apparatus for simulating window drop interference. Window drop interference is generated during actual tactical operation by the release of metallic material from an aircraft target. A metallic material re-radiates R.F. energy causing a video indication on operational radar indicators that has no definite form but which increases in size with time. Passive interference is caused by return to a radar set due to terrain or return due to atmospheric conditions. The function of the window and passive interference generator is to generate video signals that when fed through operational radars appear on respective indicators as typical passive and window interference patterns. Previously utilized methods for simulating window drop interference and passive interference relied upon prepared overlays which had a particular random pattern previously drawn thereupon. This prepared overlay was then projected upon a radar display thereby simulating window drop and passive interference. However, such a previously prepared pattern did not accurately simulate random window drop interference and passive interference. In addition, its usefulness for training purposes for training purposes was limited in that its pattern would become recognizable to trainees and it would not appear random after more than a single use.

An object of the present invention is to provide a novel window drop and passive interference generator.

A further object of the instant invention is to provide a simulation device for simulating a combination of window drop and passive interference.

Another object of the instant invention is to provide a novel simulation device for generating composite radar displays.

Still another object of the instant invention is to provide a novel device for simulating window drop interference having completely random characteristics.

Figure 1:
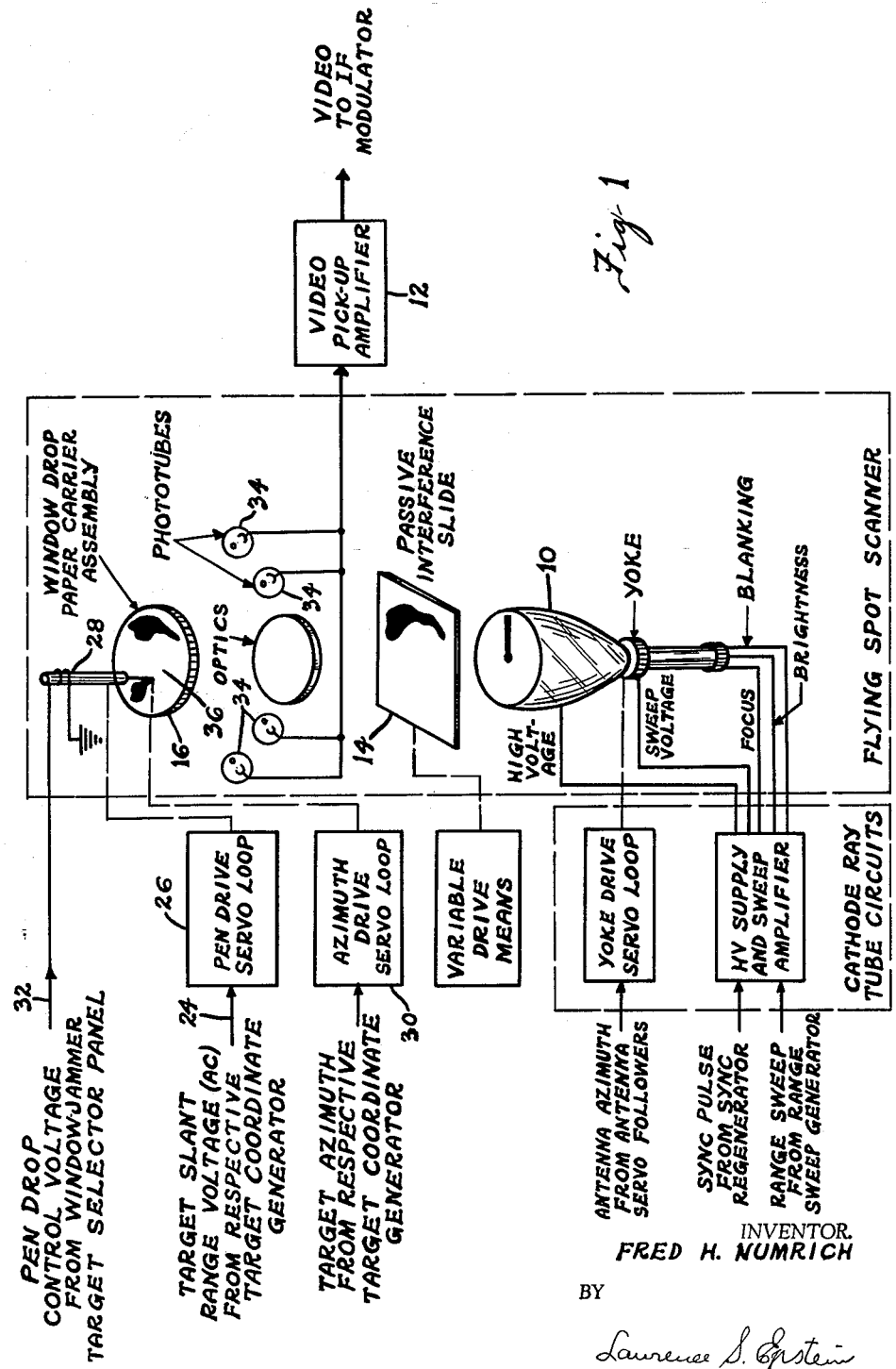
Figure 2:
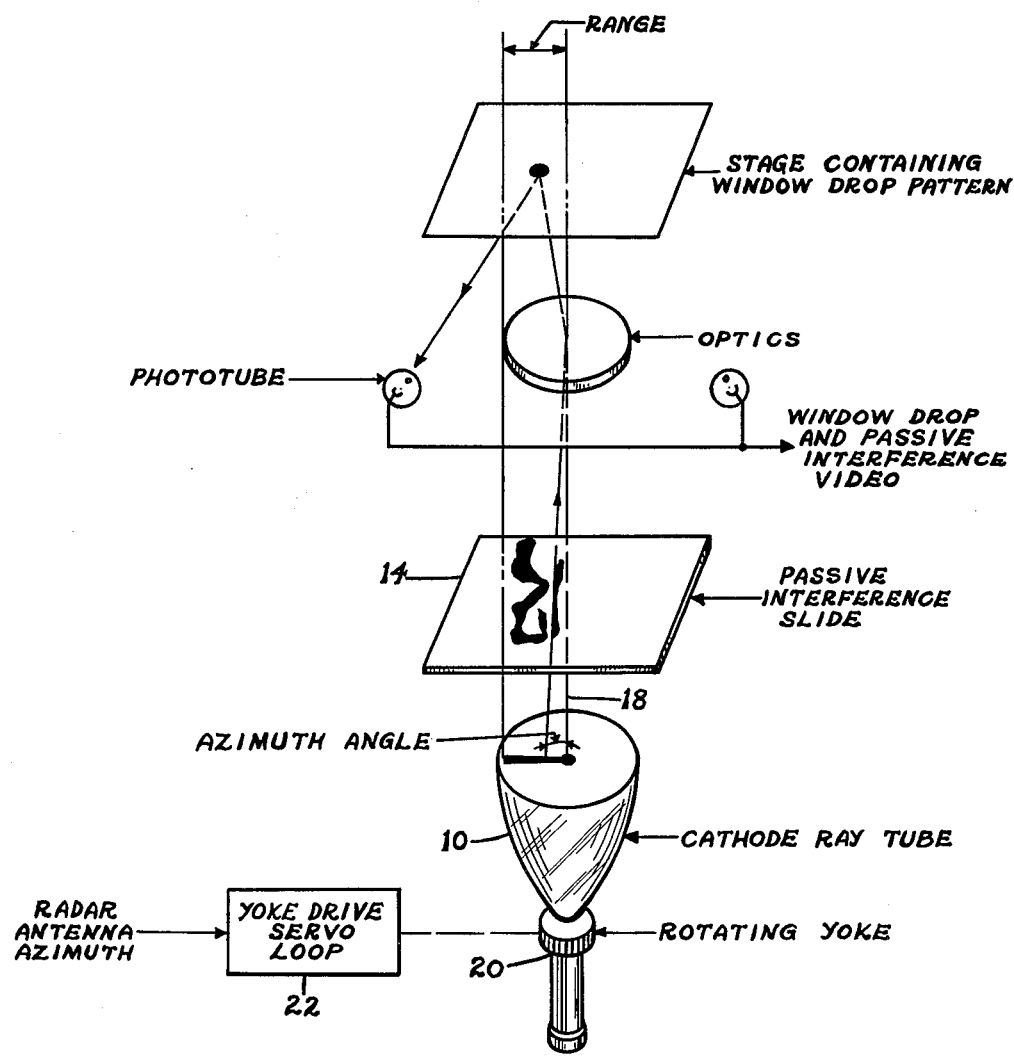

Other objects and many of the attendant advantages of this invention will be readily appreciated as the same becomes better understood by reference to the following detailed description when considered in connection with the accompanying drawings wherein:

FIG. 1 is a block functional diagram of the window and passive interference generator; and FIG. 2 is a diagram of the method for defining range and azimuth of passive interference components.

Window drop interference is generated by a moving radar target when it is desired to confuse a tracking or observing radar and thereby obscure its own radar echo. Such interference may be generated by a form of an interference screen to obscure the passage of many aircrafts or radar targets. This interference screen or window drop, comprises pieces of lightweight metal which are highly reflective and which reflect impinging radar signals in such a pattern so as to provide very strong echoes which have a random appearance. These very strong echoes tend to obscure weaker target signals or target echoes.

Referring now to FIG. 1, the light from the cathode ray tube 10 is used as a scanner. The light from the cathode ray tube sweep is converted into video signals by a photo pickup tube 12 after modulation by a passive interference transparency 14 and a translucent stage 16 containing a window drop pattern generated by ink drop. Due to the fact that the axis of the passive interference is centered with respect to that of the PPI, each passive interference component of a given range is converted into a video signal at a time required for the PPI sweep to travel from the center of the screen to an equivalent point on the transparency. This action can be visualized with the aid of FIG. 2. Thus, referring to the figure, the axis 18 passes through the passive interference slide 14 and the center of the cathode ray tube scanner 10. If the sweep of the PPI which is controlled by the rotating yoke 20 and yoke servo loop 22, is made to rotate in synchronism with the operational antenna of the simulator, this operational antenna not being shown, but being present in the operational equipment or simulation equipment, interference video is generated when respective passive interference components are at the same azimuth as the operational radar antenna. This action will then serve to provide passive interference in a similar manner as a target antenna pattern generator.

Simulation of window drop or chaff requires that this type of interference video be generated with respect to the coordinates of a moving target, that it be generated at an arbitrary time and that unlike passive interference it increases in size with respect to time.

The method utilized to provide such window drop simulation is as follows: A particular target is chosen and its particular slant range voltage for the target is applied at point 24 to pen drive servo loop 26. This A.C. slant range voltage displaces the pen 28 radially above the center of the paper carrier assembly a distance proportional to the range of the simulated aircraft target. Displacement of the pen from a given range is kept proportional to sweep speed. This is accomplished by controlling the pen drive servo loop rate of drive. The azimuth of the window drop is made to follow that of a selected target by supplying the azimuth drive servo loop 30 with a target azimuth signal. The azimuth drive servo loop 30 rotates the pen carrier assembly 16 to an angular position that represents the instantaneous azimuth of the simulated aircraft target. Thus, when a window drop impression is initiated, the pen will deposit ink at a rate determined by an external control 32. The pen drive servo loop 26 will drive the pen to a range position determined by an external signal 24 and window drop interference video will be developed on the window drop paper assembly 16 which has a highly absorbent paper 36 positioned thereon and ink drop pen 28 is driven in an angular direction by azimuth drive servo loop 30. The photo tubes 34 will then pick up this window drop simulation ink blot pattern and apply it to the video pickup amplifier 12 which will generate signals representing window drop with respect to instantaneous range and azimuth of a selected target. The application of ink from the pen 28 is controlled by solenoids which are externally controlled. The ink forms a spreading ink drop on absorbent paper 36 which is contained on each paper carrier assembly 16. This paper is stored on a roll which is mounted underneath the carrier assembly 16. The spread of ink causes the simulation of window drop video presentation that increases in size with respect to time. Both passive interference, generated by passive interference slide 14, and window drop interference may be generated simultaneously. A conversion of the passive interference simulation and the window drop interference simulation to video signals is accomplished by the multiplier tube 34. A three-stage video amplifier 12 is used to raise the level of the passive and window interference video signals before addition to target video on an I.F. modulator section of the simulation device.

Obviously many modifications and variations of the present invention are possible in the light of the above teachings. It is therefore to be understood that within the scope of the appended claims the invention may be practiced otherwise than as specifically described.

What is claimed is:

1. A simulating device for simulating the appearance of window drop and passive interference comprising cathode ray tube scanning means providing a PPI scan, first screen means optically aligned with said scanning means, said first screen means having passive interference opaque areas drawn thereon, and second screen means optically aligned with said first screen means and said scanning means, said second screen means having window drop generating means operatively connected therewith for generation of window drop interference, and phototube pickup means optically operative with said first and second screen means and said scanning means whereby said scanning means in conjunction with said first and second screen means and said window drop generating means provide said phototube means with visual simulation of passive and window drop interference, video amplifier means, said video amplifier means connected to the output of said phototube means for generation of video signals in accordance with the appearance of said passive and window drop interference, an azimuth drive servo loop operatively connected to said second screen assembly for rotating said second screen assembly in accordance with target azimuth and information signals which are supplied from an external target coordinate generator.

2. The combination of claim 1 and a pen drive servo loop operatively connected to said window drop interference generating means for moving said window drop generating means in accordance with a target slant range signal generated by an external target coordinate generator.

3. The structure of claim 2 wherein said window drop generating means comprise a pen holder, a pen and a supply of ink, said pen holder operatively connected to hold said pen, and said ink supply operatively connected to said pen for supplying ink thereto.

4. The combination of claim 3 and control means operatively connected to said pen means for controlling the operation of said pen means and the operation of said ink supply in accordance with an external manual control means.

5. A simulating device for simulating the appearance of window drop passive interference comprising cathode ray tube scanning means providing a PPI scan, first screen means optically aligned with said scanning means, said first screen means having passive interference opaque areas drawn thereon, and second screen means optically aligned with said first screen means and said scanning means, said second screen means having window drop generating means operatively connected therewith for generation of window drop interference, phototube pickup means, said phototube pickup means being optically operative with said first and second screen means and said scanning means whereby said scanning means in conjunction with said first and second screen means and said window drop generating means provide said phototube means with visual simulation of passive and window drop interference, video amplifier means, said video amplifier means being operatively connected to the output of said phototube means for generation of video signals in accordance with the appearance of said passive and window drop interference, a pen drive servo loop operatively connected to said window drop interference generating means for moving said window drop generating means in accordance with a target slant range signal generated by an external target coordinate generator, said window drop generating means comprising a pen holder, a pen and a supply of ink, said pen holder operatively connected to hold said pen, and said ink supply operatively connected to said pen for supplying ink thereto, control means operatively connected to said pen means for controlling the operation of said pen means and the operation of said ink supply in accordance with an external manual control means, said second screen means comprising paper holder means and absorbent paper means whereby said pen means supply ink to the surface of said blotting paper means for generation of opaque ink blots which increase with time in simulation of window drop interference.

6. The structure of claim 5 and high voltage supply and sweep amplifier means, said voltage supply and sweep amplifier means being operatively connected to said cathode ray tube scanning means for providing operating high voltage, sweep voltage, focus voltage, and blanking voltage, each of said voltages being synchronized with external synchronizing circuits.

7. The combination of claim 6 and yoke means operatively connected to said cathode ray tube sweep scanning means and a yoke drive servo loop operatively connected to said yoke means for operating said yoke means in accordance with external signals for simulation of antenna scan.

8. The combination of claim 7 and variable drive means operatively connected to said first screen means for driving said screen means to provide different passive interference patterns.

References Cited in the file of this patent

UNITED STATES PATENTS

| | | |
|---|---|---|
| 2,737,730 | Spencer | Mar. 13, 1956 |
| 2,932,093 | Lang | Apr. 12, 1960 |

FOREIGN PATENTS

| | | |
|---|---|---|
| 1,022,474 | Germany | Jan. 9, 1958 |